United States Patent
Sampath

(10) Patent No.: US 8,064,837 B2
(45) Date of Patent: Nov. 22, 2011

(54) METHOD AND APPARATUS FOR OPTIMUM SELECTION OF MIMO AND INTERFERENCE CANCELLATION

(75) Inventor: Hemanth Sampath, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1291 days.

(21) Appl. No.: 11/454,762

(22) Filed: Jun. 15, 2006

(65) Prior Publication Data

US 2006/0285585 A1 Dec. 21, 2006

Related U.S. Application Data

(60) Provisional application No. 60/691,468, filed on Jun. 16, 2005.

(51) Int. Cl.
*H04B 1/00* (2006.01)
*H04B 15/00* (2006.01)
(52) U.S. Cl. ............... 455/63.1; 455/67.11; 455/101; 455/102
(58) Field of Classification Search .......... 455/63.1, 455/67.11, 101, 102, 103, 450, 501, 513, 455/553.1, 570
See application file for complete search history.

(56) References Cited

U.S. PATENT DOCUMENTS

| | | | |
|---|---|---|---|
| 6,873,614 B2 * | 3/2005 | Kloos et al. | 370/347 |
| 6,920,192 B1 * | 7/2005 | Laroia et al. | 375/347 |
| 7,606,319 B2 * | 10/2009 | Zhang et al. | 375/267 |
| 2003/0125040 A1 * | 7/2003 | Walton et al. | 455/454 |
| 2003/0185174 A1 | 10/2003 | Currivan et al. | |
| 2004/0082356 A1 | 4/2004 | Walton et al. | |
| 2005/0101259 A1 | 5/2005 | Tong et al. | |

FOREIGN PATENT DOCUMENTS

| | | |
|---|---|---|
| JP | 2004521539 T | 7/2004 |
| JP | 2005509360 | 4/2005 |
| WO | 03088548 A2 | 10/2003 |
| WO | WO03085875 A1 | 10/2003 |
| WO | WO2004047354 | 6/2004 |
| WO | 2005036799 A2 | 4/2005 |

OTHER PUBLICATIONS

International Search Report and Written Opinion—PCT/US2006/023583, International Search Authority—European Patent Office—May 4, 2007.
Taiwan Search Report—Appl. No. 095121778, Dec. 31, 2009.

* cited by examiner

*Primary Examiner* — Tuan H Nguyen
(74) *Attorney, Agent, or Firm* — Milan Patel; Howard H. Seo

(57) ABSTRACT

Systems and methodologies are described that facilitate performing interference nulling and rank prediction in an access terminal. Multiple receiver demodulator types may be implemented at the access terminal, and an interference covariance matrix may be estimated thereat. SNRs may be calculated for the various receiver demodulator types, and an optimum rank and associated CQI information may be identified and generated, respectively, which information may then be transmitted to an access point. At least one of the receiver demodulator types may perform an interference nulling protocol. For example, the receiver demodulator types may comprise at least one minimum mean-squared error interference-nulling (MMSE-IN) demodulator, along with and one or more of a maximal ratio combining (MRC) demodulator and a minimum mean-squared error (MMSE) demodulator.

30 Claims, 12 Drawing Sheets

US 8,064,837 B2

METHOD AND APPARATUS FOR OPTIMUM SELECTION OF MIMO AND INTERFERENCE CANCELLATION

CLAIM OF PRIORITY UNDER 35 U.S.C. §119

This application claims the benefit of U.S. Provisional Application Ser. No. 60/691,468, entitled "A METHOD AND APPARATUS FOR OPTIMUM SELECTION OF MIMO AND INTERFERENCE CANCELLATION," filed on Jun. 16, 2005, and assigned to the assignee hereof and hereby expressly incorporated by reference herein.

BACKGROUND

I. Field

The following description relates generally to wireless communications, and more particularly to reducing interference in a wireless communication environment.

II. Background

Wireless communication systems have become a prevalent means by which a majority of people worldwide has come to communicate. Wireless communication devices have become smaller and more powerful in order to meet consumer needs and to improve portability and convenience. The increase in processing power in mobile devices such as cellular telephones has lead to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

More particularly, frequency division based techniques typically separate the spectrum into distinct channels by splitting it into uniform chunks of bandwidth, for example, division of the frequency band allocated for wireless communication can be split into 30 channels, each of which can carry a voice conversation or, with digital service, carry digital data. Each channel can be assigned to only one user at a time. One known variant is an orthogonal frequency division technique that effectively partitions the overall system bandwidth into multiple orthogonal subbands. These subbands are also referred to as tones, carriers, subcarriers, bins, and/or frequency channels. Each subband is associated with a subcarrier that can be modulated with data. With time division based techniques, a band is split time-wise into sequential time slices or time slots. Each user of a channel is provided with a time slice for transmitting and receiving information in a round-robin manner. For example, at any given time t, a user is provided access to the channel for a short burst. Then, access switches to another user who is provided with a short burst of time for transmitting and receiving information. The cycle of "taking turns" continues, and eventually each user is provided with multiple transmission and reception bursts.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

A typical wireless communication network (e.g., employing frequency, time, and code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams carried by the composite stream. Likewise, a mobile terminal can transmit data to the base station or another mobile terminal. Such communication between base station and mobile terminal or between mobile terminals can be degraded due to channel variations and/or interference power variations.

Therefore, a need exists in the art for systems and methods that facilitate reducing interference in order to improve system throughput and enhance user experience.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to an aspect, a method of performing interference nulling and rank prediction, comprises an access terminal that implements multiple receiver demodulator types including MRC, MMSE, MMSE-IN, where "IN" represents interference nulling. The receiver demodulator types employing interference nulling include MMSE-IN. The receiver demodulator types that do not employ interference nulling include MRC and MMSE. The MMSE and MMSE-IN receivers can demodulate up to $M_R$ MIMO spatial streams, where MR is an integer greater than one, while the MRC receiver can demodulate one MIMO spatial stream, per demodulation period.

According to an aspect, a method of performing interference nulling and rank prediction in a wireless communication environment may comprise employing multiple receiver demodulator types at the access terminal; estimating an interference covariance matrix; calculating a signal-to-noise ratio (SNR) for a plurality of the multiple receiver demodulator types; determining an optimum rank and associated channel quality index (CQI) information across all receiver demodulator types to optimize transmission capacity; and transmitting the rank and CQI information to an access point; wherein at least one of the receiver demodulator types performs an interference nulling technique. The receiver demodulator types may comprise at least one minimum mean-squared error interference-nulling (MMSE-IN) demodulator and one or more of a maximal ratio combining (MRC) demodulator and a minimum mean-squared error (MMSE) demodulator. Determining an optimum rank and associated CQI information may further comprise determining an effective SNR for one or more candidate MIMO transmission ranks, generating capacity numbers corresponding to the effective SNRs, selecting a rank that optimizes capacity based on the capacity numbers, and generating CQI information by quantizing the effective SNR corresponding to the selected rank. The method may still further comprise estimating an average interference nulling gain, employing the estimated average nulling gain to calculate an SNR for at least one MRC receiver demodulator and at least one MMSE receiver demodulator, determining an optimum rank for and associated CQI information across the at least one MRC receiver demodulator and the at least one MMSE receiver demodulator, and transmitting the optimum rank and CQI information to an access point.

Estimating the average interference nulling gain may additionally comprise determining an effective SNR for the one or more candidate MIMO transmission ranks for one or more receiver demodulator types, determining a delta-effective SNR by computing a difference between effective SNRs for receiver demodulator types that employ interference nulling and receiver demodulator types that do not employ interference nulling, and determining the average interference nulling gain by averaging the delta-effective SNR over a plurality of time slots and tones. Employing the estimated average nulling gain to calculate an SNR for at least one MRC receiver demodulator and at least one MMSE receiver demodulator may still further comprise determining an effective SNR for the one or more candidate MIMO transmission ranks for one or more receiver demodulator types that do not incorporate interference nulling, adding the average interference nulling gains to the effective SNR values for the one or more candidate MIMO transmission ranks, generating capacity numbers corresponding to the effective SNR values, selecting a rank that optimizes capacity, and generating CQI information by quantizing the effective SNR corresponding to the selected rank.

According to another aspect, an apparatus that facilitates performing interference nulling and rank prediction using hypothesis decoding in an access terminal may comprise: a receiver with multiple receiver demodulators at the access terminal; a processor that estimates an interference covariance matrix, calculates a signal-to-noise ratio (SNR) for a plurality of the multiple receiver demodulators, and determines an optimum rank and associated channel quality index (CQI) information across all receiver demodulators to optimize transmission capacity; and a transmitter that transmits the rank and CQI information to an access point, wherein at least one of the receiver demodulators employs an interference nulling technique. The receiver demodulators comprise at least one minimum mean-squared error interference-nulling (MMSE-IN) demodulator and one or more of a maximal ratio combining (MRC) demodulator and a minimum mean-squared error (MMSE) demodulator. The processor may additionally determine an optimum rank and associated CQI information by determining an effective SNR for one or more candidate MIMO transmission ranks, generating capacity numbers corresponding to the effective SNRs, selecting a rank that optimizes capacity based on the capacity numbers, and generating CQI information by quantizing the effective SNR corresponding to the selected rank. The processor may further estimate an average interference nulling gain, employ the estimated average nulling gain to calculate an SNR for at least one MRC receiver demodulator and at least one MMSE receiver demodulator, and determine an optimum rank for and associated CQI information across the at least one MRC receiver demodulator and the at least one MMSE receiver demodulator. According to other aspects, the processor may estimate the average interference nulling gain by determining an effective SNR for the one or more candidate MIMO transmission ranks for one or more receiver demodulators, determining a delta-effective SNR by computing a difference between effective SNRs for receiver demodulators that employ interference nulling and receiver demodulators that do not employ interference nulling, and calculating the average interference nulling gain by averaging the delta-effective SNR over a plurality of time slots and tones. According to still other aspects, the processor may employ the estimated average nulling gain to calculate an SNR for at least one MRC receiver demodulator and at least one MMSE receiver demodulator, by determining an effective SNR for the one or more candidate MIMO transmission ranks for one or more receiver demodulator types that do not incorporate interference nulling, adding the average interference nulling gains to the effective SNR values for the one or more candidate MIMO transmission ranks, generating capacity numbers corresponding to the effective SNR values, selecting a rank that optimizes capacity, and generating CQI information by quantizing the effective SNR corresponding to the selected rank.

According to a further aspect, an apparatus that facilitates performing interference nulling and rank prediction in an access terminal comprises means for employing multiple receiver demodulator types at the access terminal, means for estimating an interference covariance matrix, means for calculating a signal-to-noise ratio (SNR) for a plurality of the multiple receiver demodulator types, means for determining an optimum rank and associated channel quality index (CQI) information across all receiver demodulator types to optimize transmission capacity, and means for transmitting the rank and CQI information to an access point, where at least one of the receiver demodulator types performs an interference nulling technique. Receiver demodulator types may comprise at least one minimum mean-squared error interference-nulling (MMSE-IN) demodulator and one or more of a maximal ratio combining (MRC) demodulator and a minimum mean-squared error (MMSE) demodulator. The means for determining an optimum rank and associated CQI information determines an effective SNR for one or more candidate MIMO transmission ranks, generates capacity numbers corresponding to the effective SNRs, selects a rank that optimizes capacity based on the capacity numbers, and generates CQI information by quantizing the effective SNR corresponding to the selected rank. The apparatus may further comprise means for estimating an average interference nulling gain, means for employing the estimated average nulling gain to calculate an SNR for at least one MRC receiver demodulator and at least one MMSE receiver demodulator, and means for determining an optimum rank for and associated CQI information across the at least one MRC receiver demodulator and the at least one MMSE receiver demodulator. The means for estimating the average interference nulling gain determines an effective SNR for the one or more candidate MIMO transmission ranks for one or more receiver demodulator types, determines a delta-effective SNR by computing a difference between effective SNRs for receiver demodulator types that employ interference nulling and receiver demodulator types that do not employ interference nulling, and calculates the average interference nulling gain by averaging the delta-effective SNR over a plurality of time slots and tones. The means for employing the estimated average nulling gain to calculate an SNR for at least one MRC receiver demodulator and at least one MMSE receiver demodulator determines an effective SNR for the one or more candidate MIMO transmission ranks for one or more receiver demodulator types that do not incorporate interference nulling, adds the average interference nulling gains to the effective SNR values for the one or more candidate MIMO transmission ranks, generates capacity numbers corresponding to the effective SNR values, selects a rank that optimizes capacity, and generates CQI information by quantizing the effective SNR corresponding to the selected rank.

According to yet another aspect, a computer-readable medium that stores computer-executable instructions for: employing multiple receiver demodulator types at the access terminal; estimating an interference covariance matrix; calculating a signal-to-noise ratio (SNR) for a plurality of the multiple receiver demodulator types; determining an optimum rank and associated channel quality index (CQI) information across all receiver demodulator types to optimize transmission capacity; and transmitting the rank and CQI information to an access point, wherein at least one of the receiver demodulator types performs an interference nulling technique. The receiver demodulator types may comprise at least one minimum mean-squared error interference-nulling (MMSE-IN) demodulator and one or more of a maximal ratio combining (MRC) demodulator and a minimum mean-squared error (MMSE) demodulator. The computer-readable medium may additionally store instructions for performing any of the various acts described above, with regard to method(s) of the subject innovation.

Still another aspect relates to a processor that executes computer-executable instructions for performing rank prediction with interference nulling, the instructions comprising: employing multiple receiver demodulator types at the access terminal; estimating an interference covariance matrix; calculating a signal-to-noise ratio (SNR) for a plurality of the multiple receiver demodulator types; determining an optimum rank and associated channel quality index (CQI) information across all receiver demodulator types to optimize transmission capacity; and transmitting the rank and CQI information to an access point, where at least one of the receiver demodulator types performs an interference nulling technique. The processor may furthermore execute any and all instructions related to performing the various acts of the method(s) described herein, and/or to provide any and all functionality related to the apparatus(es) described herein. For example, the processor may execute the instructions stored by the computer-readable medium, etc.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
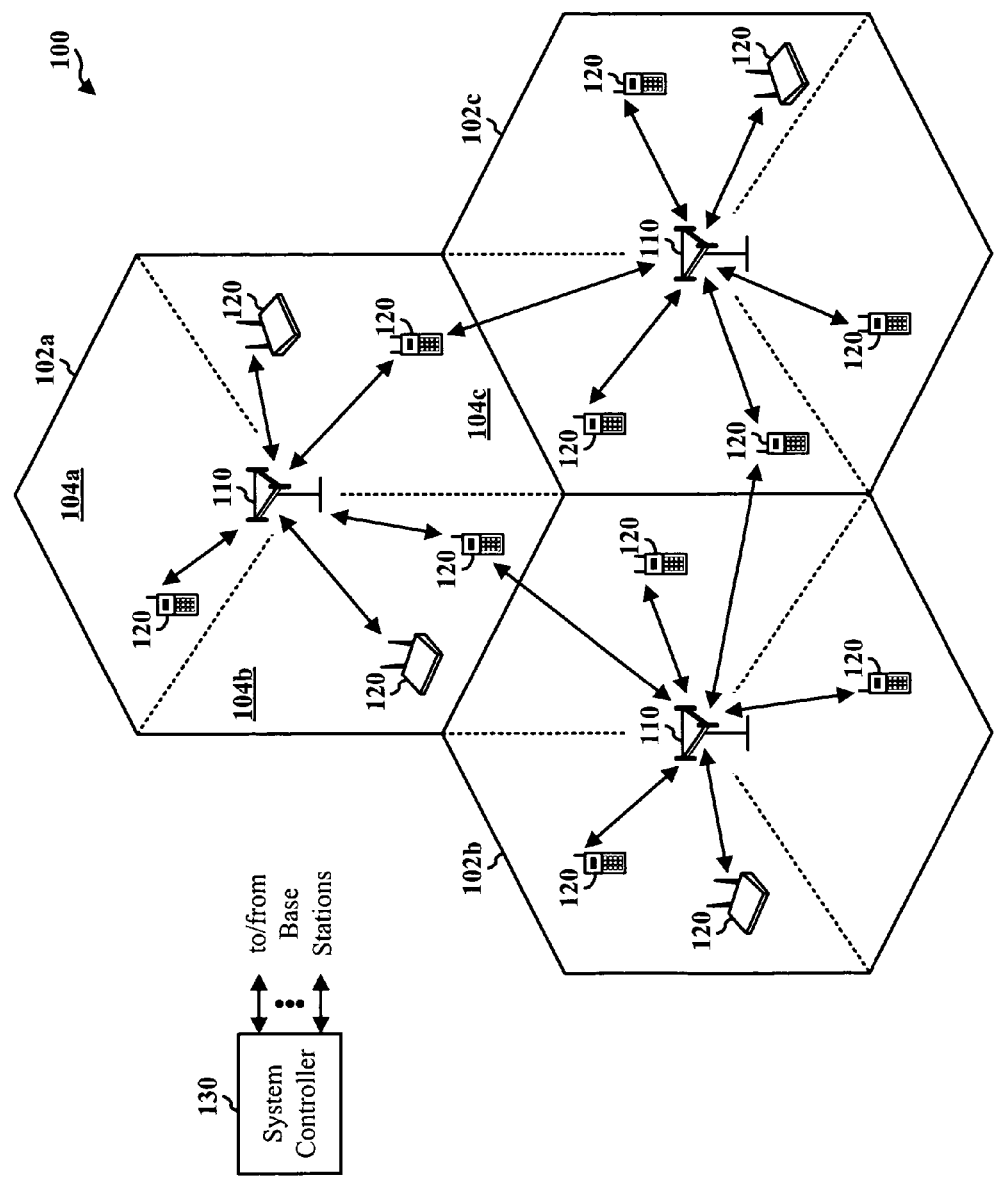
FIG. 1 illustrates a wireless communication system with multiple base stations and multiple terminals, in accordance with one or more aspects.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "system," and the like are intended to refer to a computer-related entity, either hardware, software, software in execution, firmware, middle ware, microcode, and/or any combination thereof. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complimented by additional components in order to facilitate achieving the various aspects, goals, advantages, etc., described with regard thereto, and are not limited to the precise configurations set forth in a given figure, as will be appreciated by one skilled in the art.

Furthermore, various embodiments are described herein in connection with a subscriber station. A subscriber station can also be called a system, a subscriber unit, mobile station, mobile, remote station, access point, remote terminal, access terminal, user terminal, user agent, a user device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. It will be appreciated that the word "exemplary" is used herein to mean "serving as an example, instance, or illustration." Any embodiment or design described herein as "exemplary" is not necessarily to be construed as preferred or advantageous over other embodiments or designs.

FIG. 1 illustrates a wireless communication system 100 with multiple base stations 110 and multiple terminals 120, which may be employed in conjunction with one or more aspects described herein. A base station is generally a fixed station that communicates with the terminals and may also be called an access point, a Node B, or some other terminology. Each base station 110 provides communication coverage for a particular geographic area 102. The term "cell" can refer to a base station and/or its coverage area depending on the context in which the term is used. To improve system capacity, a base station coverage area may be partitioned into multiple smaller areas (e.g., three smaller areas), according to FIG. 1, 104a, 104b, and 104c. Each smaller area may be served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The transmission techniques described herein may be used for a system with sectorized cells as well as a system with un-sectorized cells. For simplicity, in the following description, the term "base station" is used generically for a fixed station that serves a sector as well as a fixed station that serves a cell.

Terminals 120 are typically dispersed throughout the system, and each terminal may be fixed or mobile. A terminal may also be called a mobile station, user equipment, a user device, or some other terminology. A terminal may be a wireless device, a cellular phone, a personal digital assistant (PDA), a wireless modem card, and so on. Each terminal 120 may communicate with zero, one, or multiple base stations on the downlink and uplink at any given moment. The downlink (or forward link) refers to the communication link from the base stations to the terminals, and the uplink (or reverse link) refers to the communication link from the terminals to the base stations.

For a centralized architecture, a system controller 130 couples to base stations 110 and provides coordination and control for base stations 110. For a distributed architecture, base stations 110 may communicate with one another as needed. Data transmission on the forward link occurs from one access point to one access terminal at or near the maximum data rate that can be supported by the forward link and/or the communication system. Additional channels of the forward link (e.g., control channel) may be transmitted from multiple access points to one access terminal. Reverse link data communication may occur from one access terminal to one or more access points.

After registration, which allows an access terminal to access an access network, access terminal 120 and one of the access points, such as access point 110, establish a communication link using a predetermined access procedure. In the connected state resulting from the predetermined access procedure, access terminal 120 can receive data and control messages from access point 100 and is able to transmit data and control messages to access point 100. Access terminal 120 continually searches for other access points that may be added to an active set of access terminal 120. An active set comprises a list of access points capable of communicating with access terminal 120. When such an access point is found, access terminal 120 can calculate a quality metric of the access point's forward link, which may comprise a signal-to-interference and-noise ratio (SINR, or SNR). An SINR may be determined in accordance with a pilot signal. Access terminal 120 searches for other access points and determines SINRs for respective access points. Concurrently, access terminal 120 calculates a quality metric of a forward link for each access point in the active set of access terminal 120. If the forward link quality metric from a particular access point is above a predetermined add threshold or below a predetermined drop threshold for a predetermined period of time, access terminal 120 can report such information to access point 110. Subsequent messages from access point 110 may direct access terminal 120 to add to or to delete from the access terminal 120 active set the particular access point.

Access terminal 120 can additionally select a serving access point from the access terminal's 120 active set based on a set of parameters. A serving access point is an access point that is selected for data communication by a particular access terminal or an access point that is communicating data to the particular access terminal. The set of parameters may comprise any one or more of present and previous SINR measurements, a bit-error-rate, a packet-error-rate, for example, and any other known or desired parameters. Thus, for example, the serving access point may be selected in accordance with the largest SINR measurement. Access terminal 120 can then broadcast a data request message (DRC message) on a data request channel (DRC channel). The DRC message can contain a requested data rate or, alternatively, an indication of a quality of the forward link (e.g., measured SINR, a bit-error-rate, a packet-error-rate, . . . ) and the like. Access terminal 120 may direct the broadcast of the DRC message to a specific access point by the use of a code, which uniquely identifies the specific access point.

The data to be transmitted to access terminal 120 can be received by access network controller 130. Thereafter, access network controller 130 may send the data to all access points in the access terminal 120 active set. Alternatively, access network controller 130 may first determine which access point was selected by the access terminal 120 as the serving access point, and then send the data to the serving access point. The data can be stored in a queue at the access point(s). A paging message may then be sent by one or more access points to access terminal 120 on respective control channels. Access terminal 120 demodulates and decodes the signals on one or more control channels to obtain the paging messages.

In accordance with one or more aspects set forth herein, rank prediction may be employed to determine how many layers to transmit in each transmission, wherein access terminal 120 has knowledge of a channel over which a serving sector access point 110 is transmitting. Rank prediction may be utilized in conjunction with interference nulling protocols to generate channel/interference covariance matrices associated with neighboring access points that are also available to access terminal 120, which can describe real-time interference from neighboring sectors. In addition, various determinations may be made, based on the covariance matrices, regarding when to perform interference nulling, when to employ a multiple-input, multiple-output (MIMO) minimum mean-squared error (MMSE) protocol, how many MIMO layers to transmit, etc. That is, the various aspects described herein facilitate performing rank and channel quality index (CQI) computation in conjunction with interference nulling.

Figure 2:
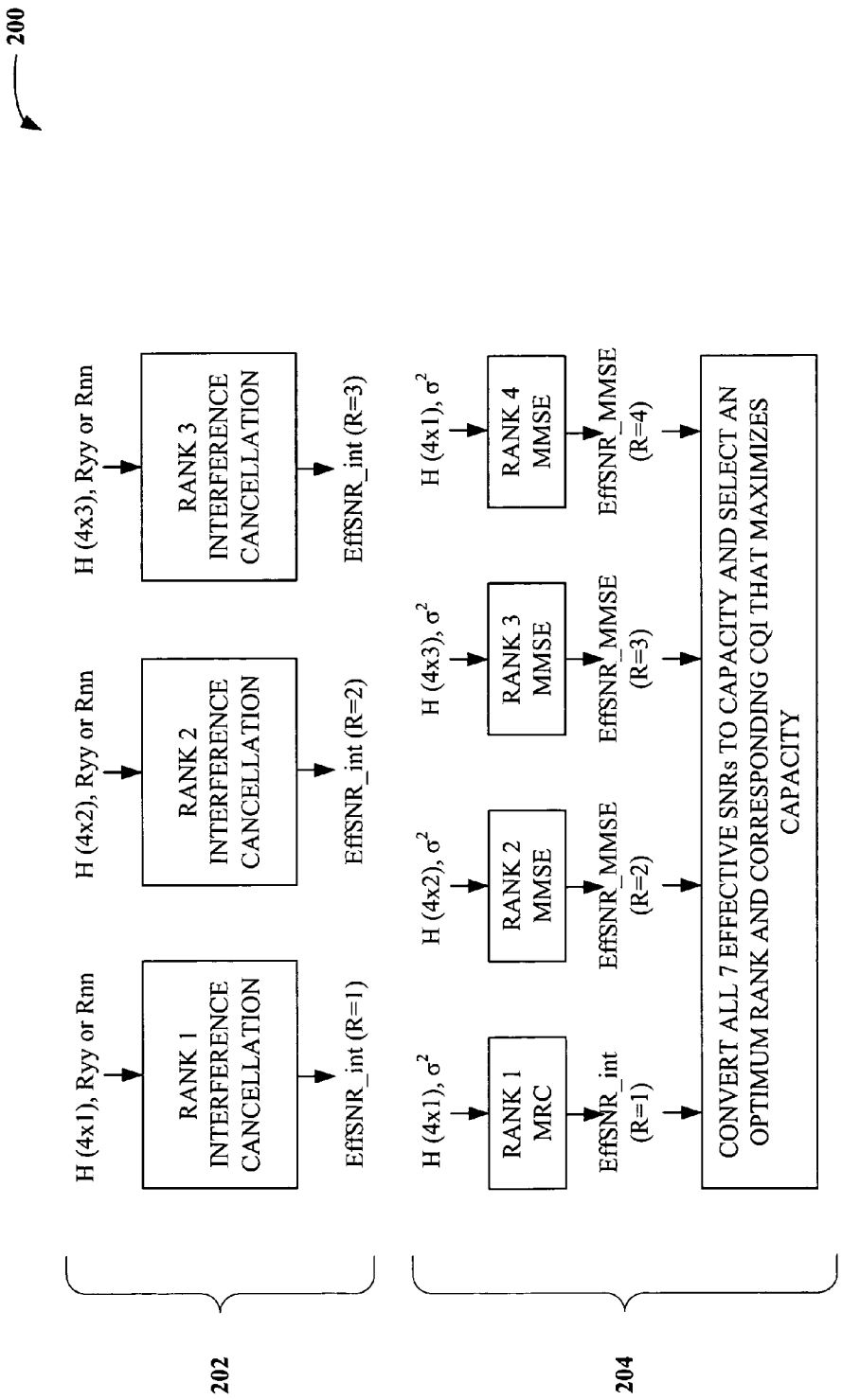
FIG. 2 is an illustration of a flow diagram that describes a method of performing MIMO-SCW CQI and rank computation by incorporating interference nulling in a wireless communication environment, in accordance with various aspects.

FIG. 2 is an illustration of a flow diagram 400 that describes a method of performing MIMO-SCW CQI and rank computation by incorporating interference in a wireless communication environment, in accordance with various aspects. According to the figure, during a first phase 202, a plurality of channel matrices (H) may be generated in addition to an interference covariance matrix, Rnn, for each of a plurality of interference nulling receivers, which may facilitate determining a rank for each receiver. Additionally, an effective SNR for each receiver (EffSNR_int) may be calculated. During a second phase 204, a plurality of channel matrices (H) may be generated (e.g., 4×1, 4×2, 4×3, etc.). The channel matrices may be utilized to calculate ranks for one or more receivers (e.g., MRC, MMSE, etc.). Once rank has been calculated, effective SNRs for each receiver may be calculated. Finally, the effective SNRs (e.g., seven effective SNRs according to the figure, although more or fewer receivers and associated SNRs may be utilized) may be capacity mapped, and a rank and CQI may be selected to maximize capacity (e.g., an optimum rank and associated CQI). For instance, if the rank predicted is 1, 2, or 3, then interference nulling gains can be obtained. The algorithm may assume that the interference profile does not change from the time the CQI and rank is computed to the time when the AT is scheduled with data.

Figure 3:
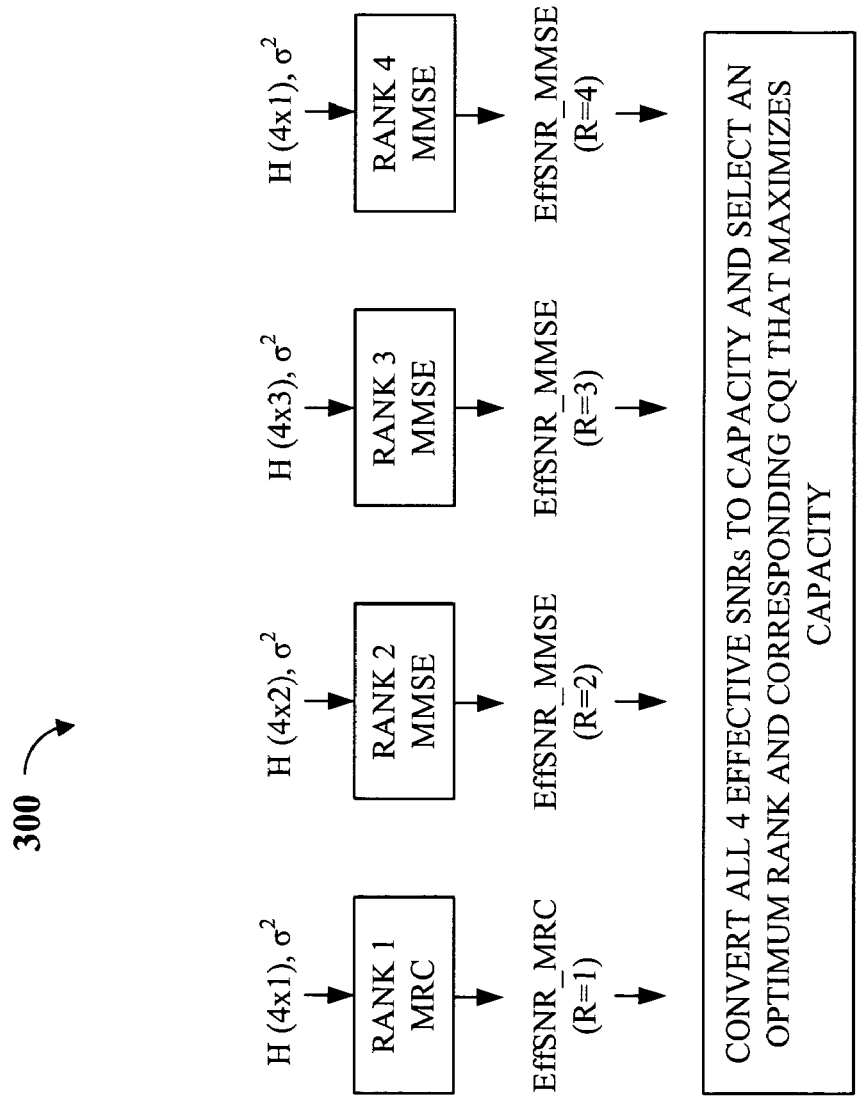
FIG. 3 is an illustration of a flow diagram that describes another method of performing MIMO-SCW CQI and rank computation by incorporating interference nulling in a wireless communication environment, in accordance with various aspects.

FIG. 3 is an illustration of a flow diagram 500 for performing MIMO-SCW CQI and rank computation, in accordance with one or more aspects. For instance, the procedure may be utilized e.g., in conjunction with the procedures set forth in FIG. 2) when an interference profile is capable of variation between the time the CQI and rank are computed and the time when the AT is scheduled with data. Interference nulling gains may be calculated for Ranks 1-3 (if the approach of FIG. 2 is utilized). For example, the gains may be calculated as:

Interference nulling gain (Rank 1)=$EffSNR\_int$
 $(R=1)-EffSNR\_MRC\ (R=1)$

Interference nulling gain (Rank 2)=$EffSNR\_int$
 $(R=1)-EffSNR\_MMSE\ (R=1)$

Interference nulling gain (Rank 3)=$EffSNR\_int$
 $(R=1)-EffSNR\_MMSE\ (R=1)$

The gains may be averaged over time, if desired. If the interference nulling gains are substantial, (e.g., greater than some threshold T), then the interference nulling gains may be added to subsequent effective SNR calculations done in future frames. The effective SNR calculations may be performed by generating a plurality of channel matrices (H) (e.g., 4×1, 4×2, 4×3, etc.). The channel matrices may be utilized to calculate ranks for one or more receivers (e.g., MRC, MMSE, etc.). Once rank has been calculated, effective SNRs for each receiver may be calculated. The gains may be added such that:

$EffSNR\_\text{final}\ (R=1)=EffSNR\_MRC\ (R=1)+Int\_$
 $canc\_gain\ (R=1)>T$ $EffSNR\_\text{final}\ (R=2)=EffSNR\_MMSE\ (R=2)+Int\_$
 $canc\_gain\ (R=2)>T$ $EffSNR\_\text{final}\ (R=3)=EffSNR\_MMSE\ (R=3)+Int\_$
 $canc\_gain\ (R=3)>T$ $EffSNR\_\text{final}\ (R=4)=EffSNR\_MMSE\ (R=4)$ The final effective SNRs may be capacity mapped, and a rank and CQI may be selected to maximize capacity (e.g., an optimum rank and associated CQI).

Referring to FIGS. 4-10, methodologies relating to calculating rank and CQI for receivers in the presence of an interference nulling technique are illustrated. For example, methodologies can relate to rank prediction with interference nulling in an FDMA environment, an OFDMA environment, a CDMA environment, a WCDMA environment, a TDMA environment, an SDMA environment, or any other suitable wireless environment. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Figure 4:
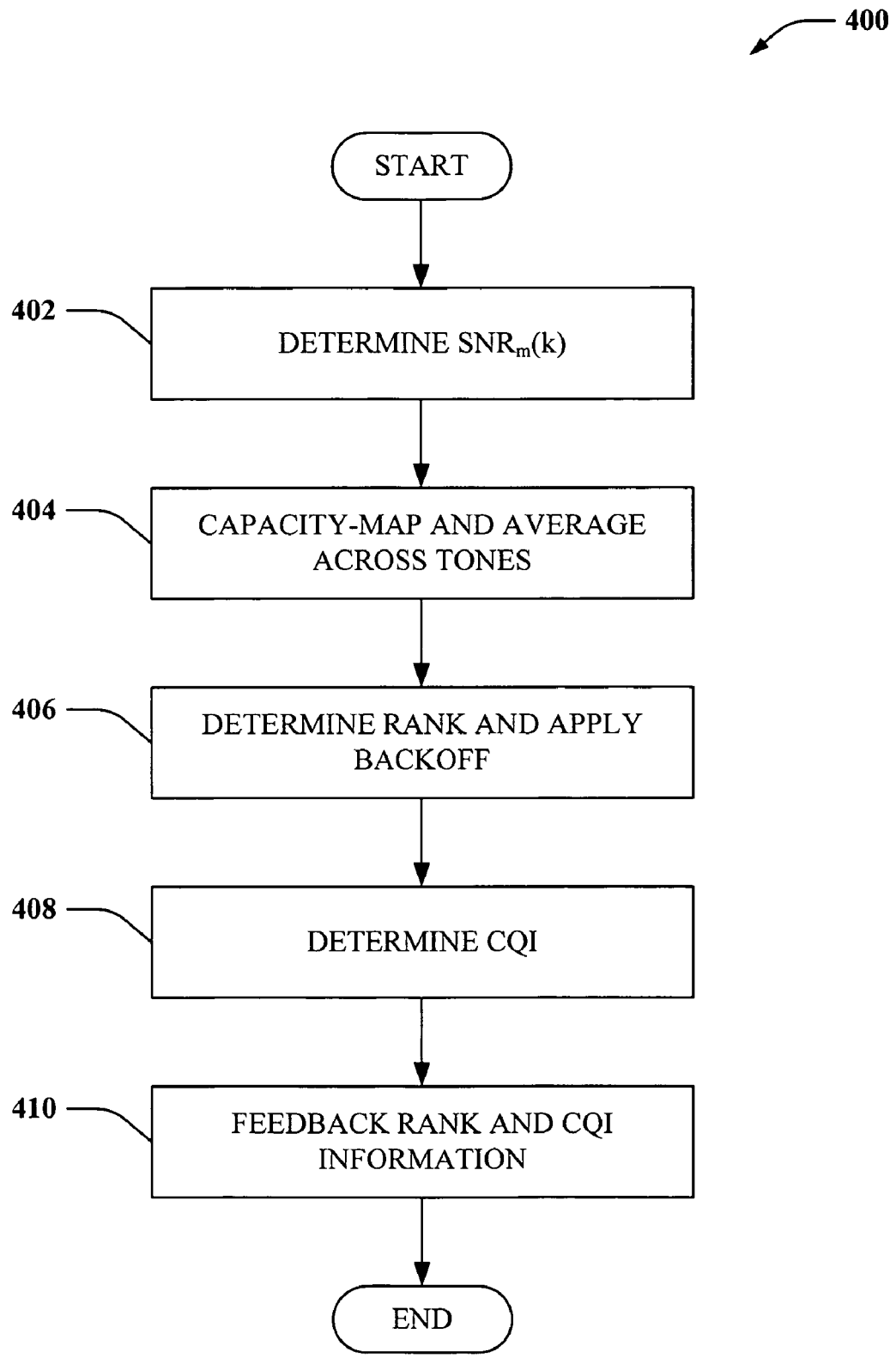
FIG. 4 is an illustration of a method of performing rank and CQI calculation and selecting an optimum rank for a receiver, corresponding to flow diagram in FIG. 2.

FIG. 4 is an illustration of a method 400 of performing rank and CQI calculation and selecting an optimum rank for a receiver, in accordance with one or more aspects described herein. At 402, a signal-to-noise ratio (SNR) for a given tone index, k, may be evaluated such that for a given rank, m:

$$SNR_m^{(k)}=f(H,Rnn,m,k)$$

where H represents an $m_R \times m_T$ matrix defining the channel(s) over which transmission will occur, and Rnn is an $m_R \times m_R$ interference covariance matrix. Each SNR may then be capacity-mapped and averaged across all tones, at 404. At 406, a rank may be selected such that m=argmax$_m$ [Cap$_m$], as set forth above with regard to the preceding figures. Also at 406, backoff may be applied to reflect a given implementation (e.g., a turbo-decoder protocol, a channel estimation error protocol, . . . ) to provide a more conservative rank estimation, which in turn provides an optimum rank, M, for the given receiver. Once the optimum rank has been determined, at 408, CQI may be computed by evaluating the effective SNR for the rank, M (e.g., via a table lookup), such that EffSNR=f[Cap$_m$]. Optimal rank and associated CQI information may be fed back from an access terminal to an access point, at 410. Since the expressions above account for Rnn and the channel matrix, H, they may be utilized to assess an optimal tradeoff between data transmission rate and interference nulling.

It will be appreciated that, in instances where Rnn may not be accurately estimated, SNR may be a function of the channel matrix, such that:

$$Ryy=HH^*+Rnn \rightarrow Rnn=Ryy-HH^*$$

where Rnn is the interference covariance matrix, Ryy is a received covariance matrix, and HH* is the channel matrix multiplied by its own complex conjugate transpose. Since the received signal is available, Ryy may be measured and HH* may be determined to derive Rnn.

Figure 5:
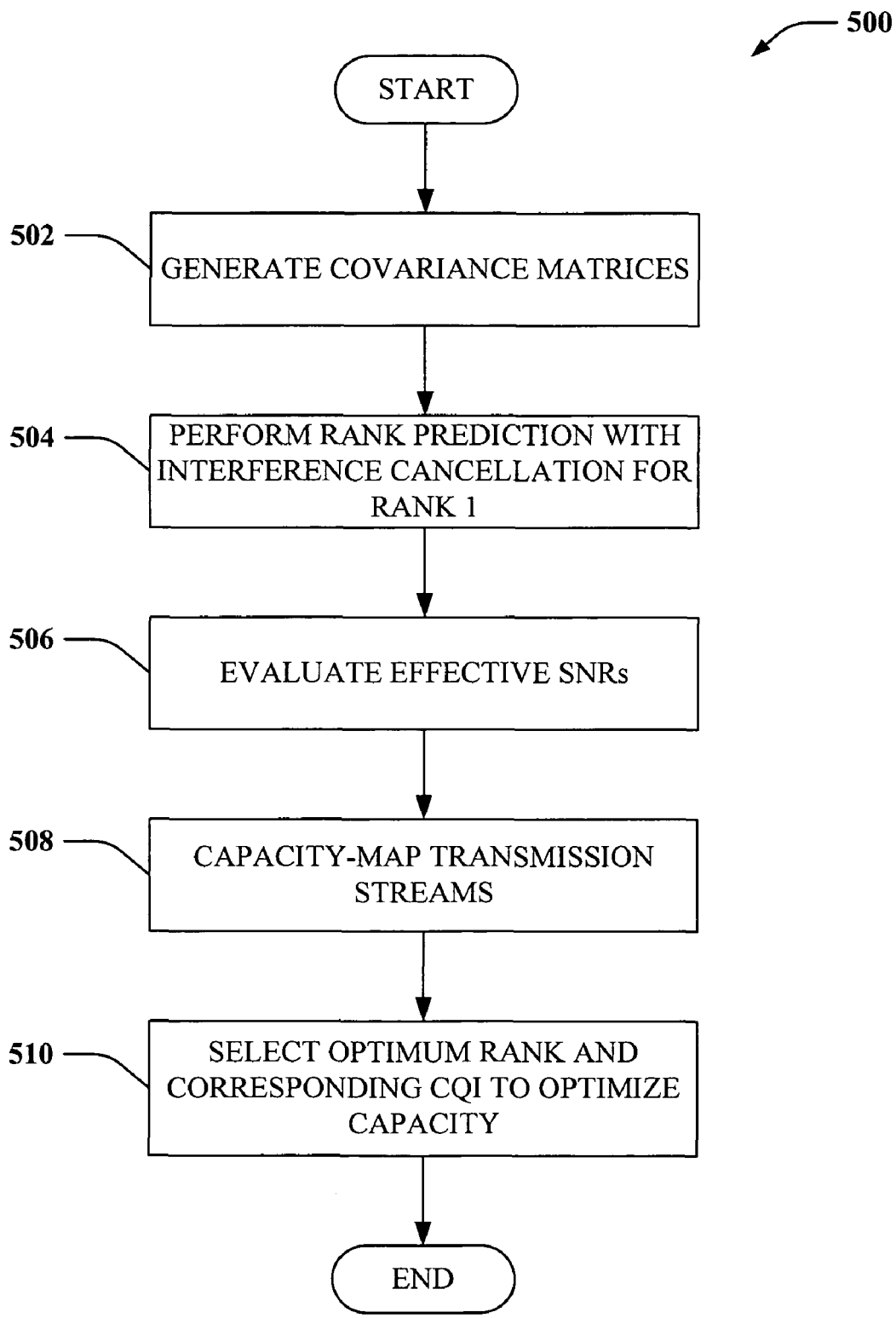
FIG. 5 illustrates a methodology for performing rank and CQI calculation and selecting an optimum rank for a receiver, corresponding to flow diagram in FIG. 3.

FIG. 5 illustrates a methodology 500 for performing rank and CQI calculation and selecting an optimum rank for a receiver in a wireless communication environment, in accordance with various aspects. At 502, one or more covariance matrices may be generated to describe an estimated amount of interference in a wireless communication region. At 504, rank prediction may be performed with interference nulling for a first rank, Rank 1, interference nulling receiver as described. Effective SNRs for the interference nulling receiver, as well as for a plurality of other receivers (e.g., MRC receivers, MMSE receivers, . . . ) of various ranks may be evaluated at 506. At 508, transmission streams may be capacity mapped as described above. At 510, an optimum rank and corresponding CQI may be selected to maximize transmission capacity. For instance, if the rank predicted is 1, then interference nulling gains can be obtained. The algorithm may assume that the interference profile does not change from the time the CQI and rank is computed to the time when the AT is scheduled with data.

In accordance with some aspects, rank biasing may be performed to bias the rank selection so that a rank of 1 is favored in situations where interference nulling gains can be realized. Rank biasing can be enabled based on, for instance, a carrier-to-interference ratio (C/I) per received antenna. A substantial portion of interference nulling gains may be realized, for example, for C/I<5 dB, and an interference profile for effective SNR with interference nulling and Rank 1 transmission may be substantially higher than the effective SNR with an MRC receiver and Rank 1 transmission. According to further aspects, interference nulling can give substantial performance gains at an access terminal with multiple antennas. Interference nulling can be further increased by an accurate estimation of the interference covariance matrix (Rnn), or the received covariance matrix (Ryy). In scenarios where accurate estimation thereof is not available, multiple hypothesis decoding may be implemented to maximize the performance of multiple receivers while mitigating any detrimental aspects of the receivers. For instance, if Rank=1 (in a SISO transmission), the access terminal may implement an MRC receiver and an MMSE interference nulling receiver.

Figure 6:
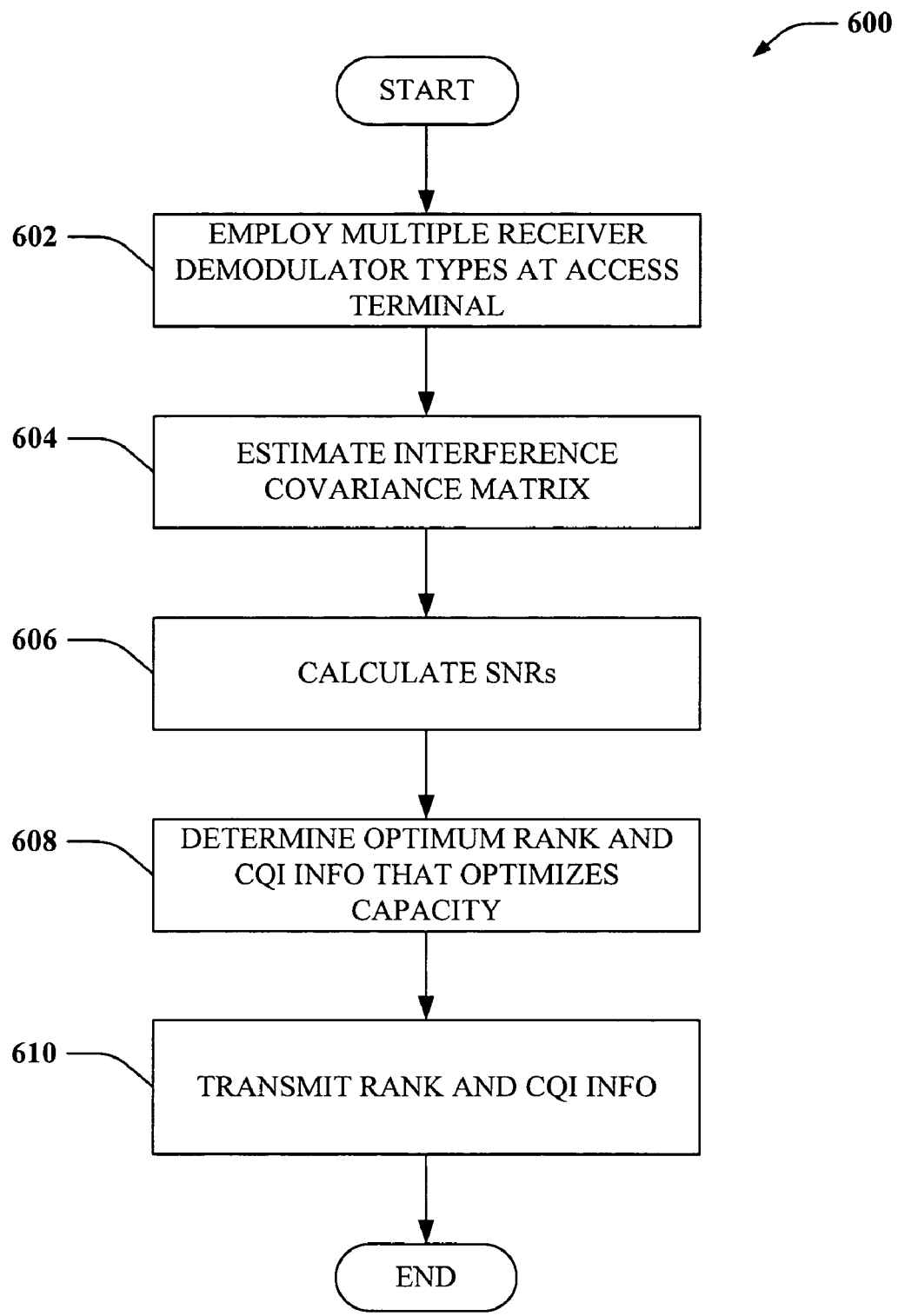
FIG. 6 is an illustration of a method 600 for performing interference nulling and rank prediction in an access terminal in a wireless communication environment, in accordance with various aspects described herein.

FIG. 6 is an illustration of a method 600 for performing interference nulling and rank prediction in an access terminal in a wireless communication environment, in accordance with various aspects described herein. At 602, multiple receiver demodulator types may be employed in a receiver in an access terminal (e.g., a wireless device, a cellular phone, a smart phone, a PDA, or any other access terminal suitable for communicating with an access point). The multiple demodulator types may include, without being limited to, minimum mean-squared error (MMSE) demodulators, minimum mean-squared error interference-nulling (MMSE-IN) demodulators, maximal ratio combining (MRC) demodulators, etc. For example, an MRC receiver can demodulate a MIMO spatial stream during a given demodulation time period, while an MMSE and/or an MMSE-IN receiver can demodulate up to $M_R$ MIMO spatial streams per demodulation time period, where $M_R$ is a number of receivers.

At 604, an interference covariance matrix may be estimated, as described above with regard to preceding figures. At 606, SNRs may be calculated for each of the demodulator types. According to some aspects, at least one of the demodulator types is an MMSE-IN demodulator. At 608, an optimum rank may be evaluated across the multiple receiver types, and CQI information associated therewith may be generated. The optimum rank is a rank that optimizes transmission capacity. The optimal rank and associated CQI information may then be transmitted, at 610, to an access point (e.g., a base station, node B, etc.)

Figure 7:
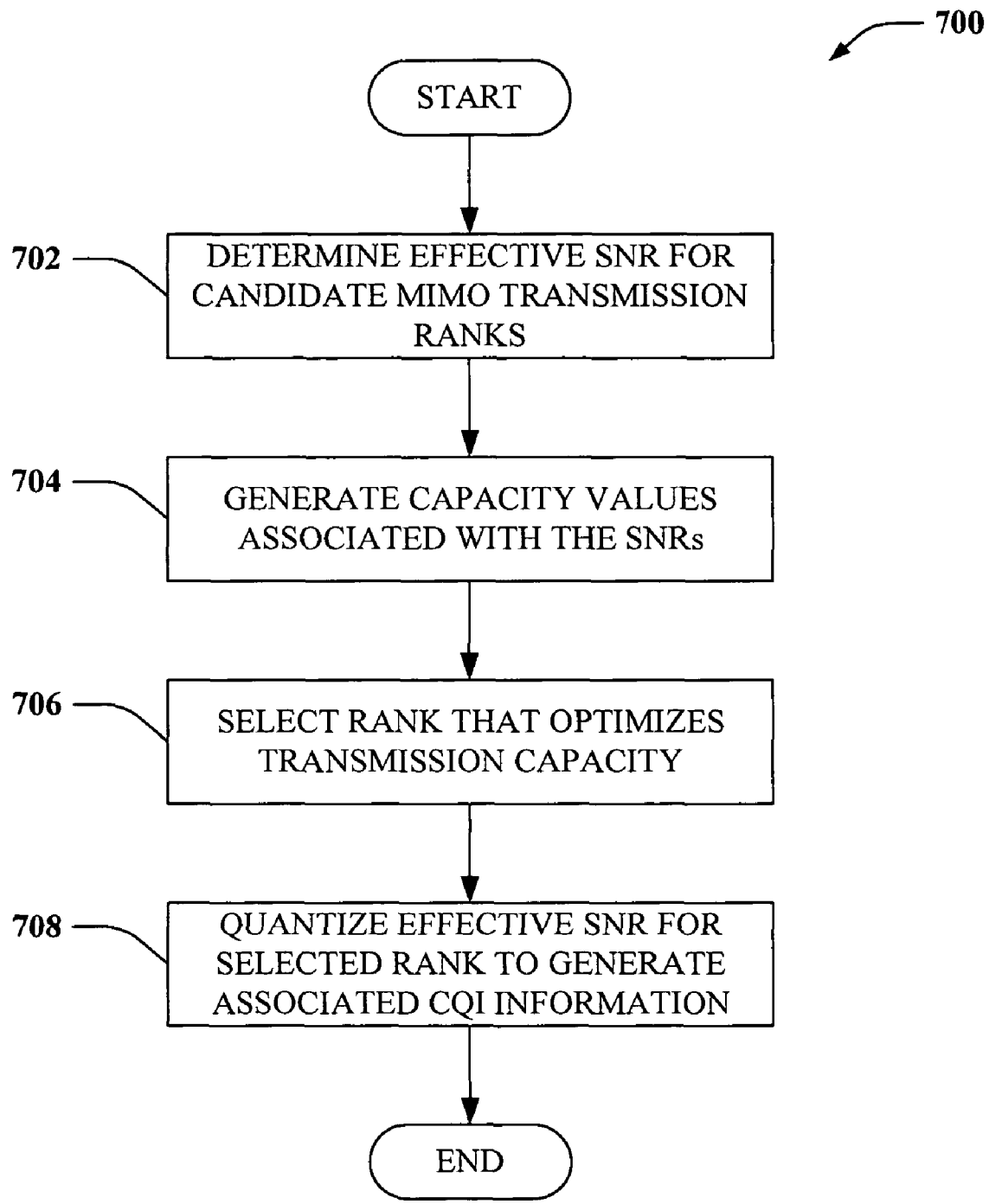
FIG. 7 is an illustration of a method 700 for determining optimum rank and associated CQI information at an access terminal in a wireless communication environment, according to one or more aspects.

FIG. 7 is an illustration of a method 700 for determining optimum rank and associated CQI information at an access terminal in a wireless communication environment, according to one or more aspects. It will be appreciated that method 700 maybe utilized in conjunction with method 600, described above. At 702, effective SNRs may be calculated for one or more candidate MIMO transmission ranks. At 704, capacity numbers corresponding to the effective SNRs may be generated (e.g., using a capacity-mapping technique, etc.). At 706, a rank that optimizes capacity may be selected based on the capacity numbers. For example, a rank having a highest capacity number or value may be selected to optimize transmission capacity. CQI information associated with the optimal rank may be generated, at 708, by quantizing the effective SNR corresponding to the selected, or optimal, rank.

Figure 8:
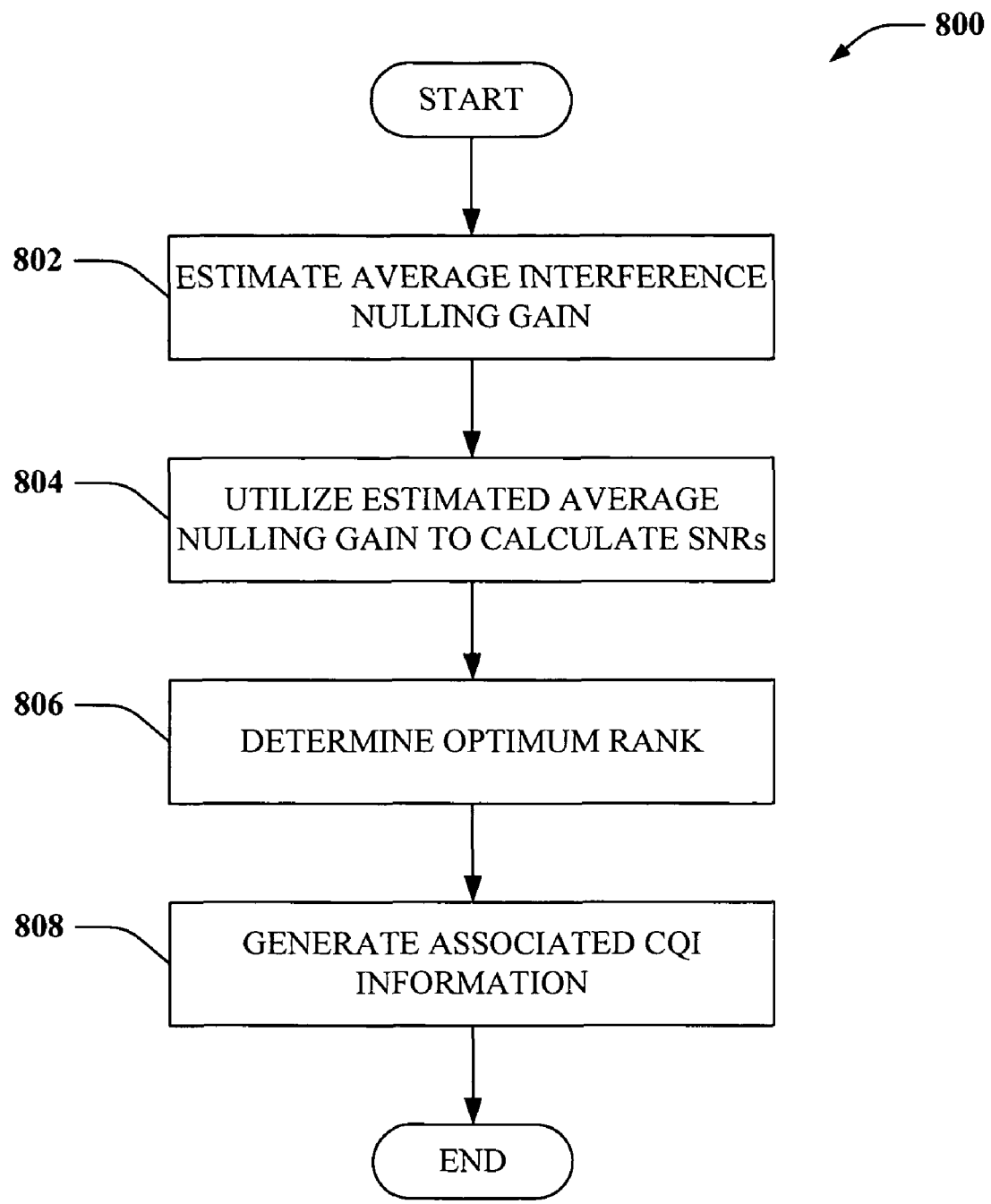
FIG. 8 is an illustration of a method 800 for performing interference nulling and rank prediction in an access terminal in a wireless communication environment, in accordance with various aspects.

FIG. 8 is an illustration of a method 800 for performing interference nulling and rank prediction in an access terminal in a wireless communication environment, in accordance with various aspects. It is to be understood that method 800 may be implemented in conjunction with either or both of methods 600 and 700. At 802, an average interference nulling gain may be estimated. The estimated average nulling gain may be utilized to calculate an SNR for one or more MRC demodulators and for one or more MMSE demodulators, at 804. At 806, an optimum rank for and associated CQI information may be determined across the one or more MRC demodulators and the one or more MMSE demodulators. At 808, the optimum rank and CQI information may be transmitted to an access point.

Figure 9:
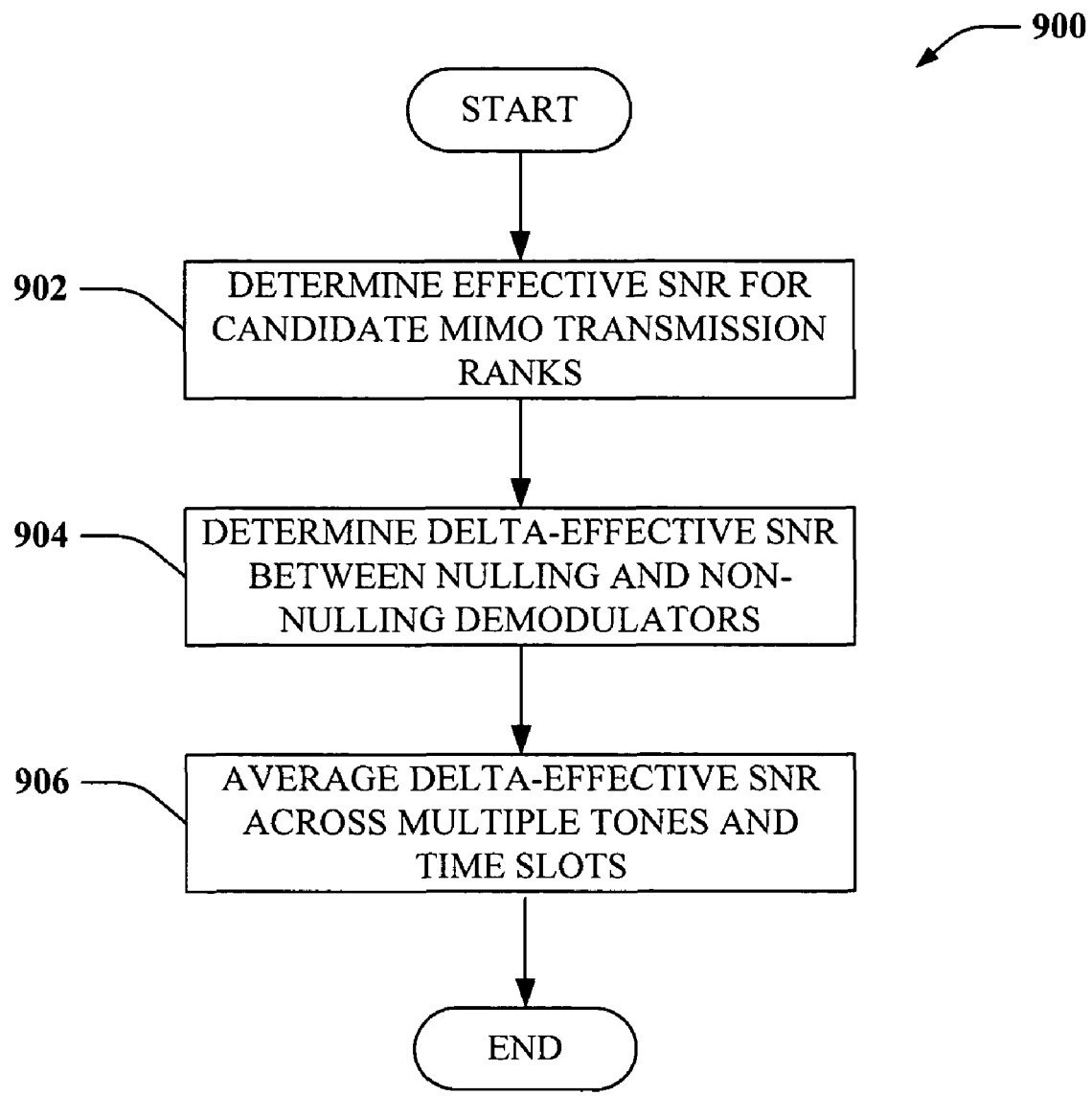
FIG. 9 illustrates a method 900 for estimating an average interference nulling gain, in accordance with one or more aspects.

FIG. 9 illustrates a method 900 for estimating an average interference nulling gain, in accordance with one or more aspects. Method 900 may be employed in conjunction with one or more of the preceding methodologies, for example, to estimate an average interference nulling gain as described above with regard to 802. At 902, effective SNRs may be evaluated for respective candidate MIMO transmission ranks for one or more demodulator types (e.g., MRC, MMSE, MMSE-IN, etc.). At 904, a "delta-" effective SNR may be calculated. The delta-effective SNR may be a difference between effective SNRs for receiver demodulator types that employ interference nulling (e.g., MMSE-IN demodulators, etc.) and demodulator types that do not employ interference nulling (e.g., MRC demodulators, MMSE demodulators, etc.). At 906, the average interference nulling gain may be determined by averaging the delta-effective SNR across a plurality of time slots and/or tones.

Figure 10:
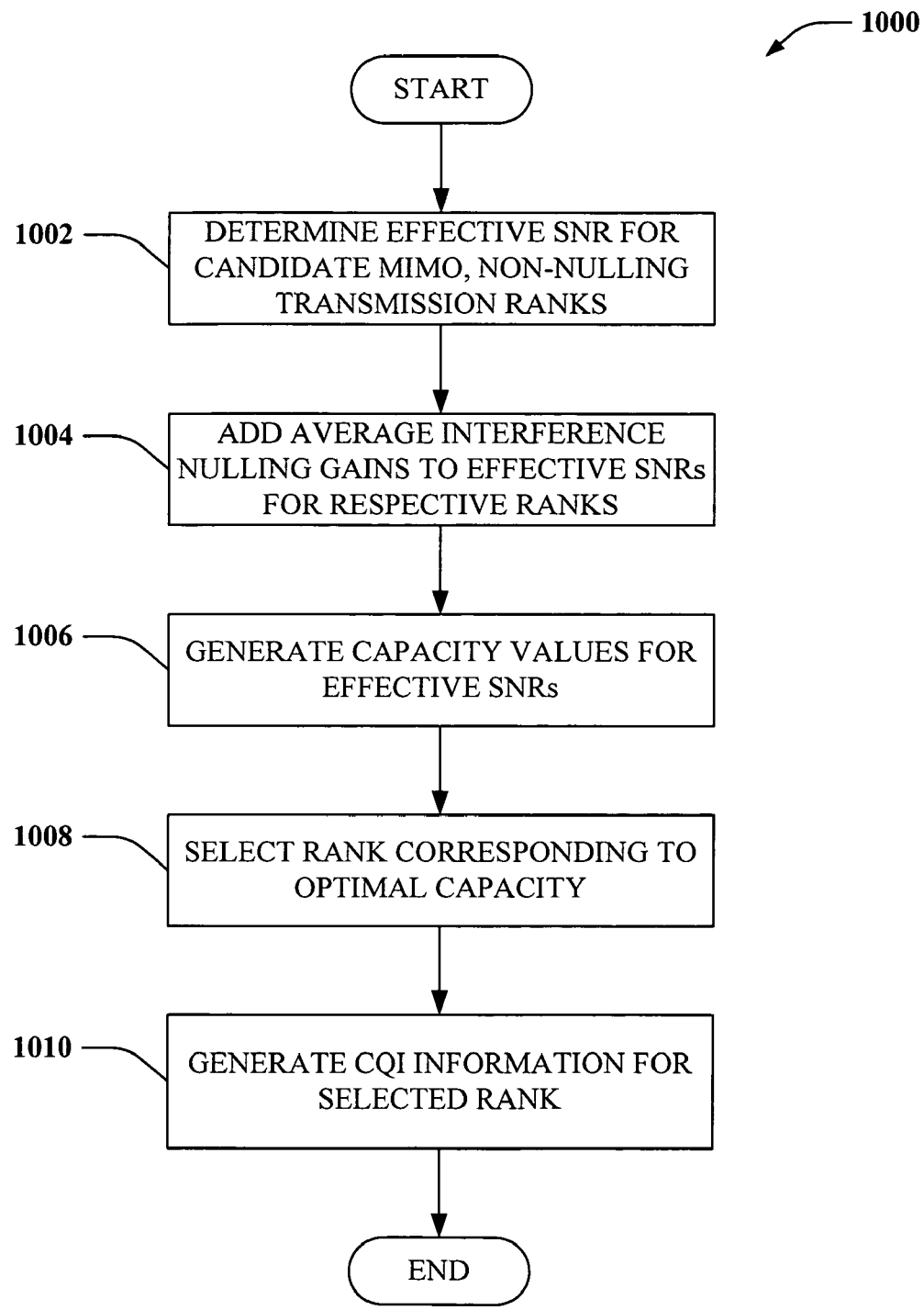
FIG. 10 illustrates a method 1000 for employing an estimated average nulling gain to calculate an SNR for non-interference-nulling demodulator types (e.g., MRC and/or MMSE demodulators), in accordance with one or more aspects.

FIG. 10 illustrates a method 1000 for employing an estimated average nulling gain to calculate an SNR for non-interference-nulling demodulator types (e.g., MRC and/or MMSE demodulators), in accordance with one or more aspects. It will be appreciated that method 1000 may be implemented in conjunction with any of the preceding methodologies. At 1002, effective SNRs may be determined for one or more candidate MIMO transmission ranks for one or more non-nulling demodulator types. At 1004, the average interference nulling gains may be added to the effective SNR values for the one or more candidate MIMO transmission ranks. At 1006, capacity numbers corresponding to the effective SNR values may be generated (e.g., using a capacity-mapping protocol, etc.). Based on the capacity values associated with each rank, a rank that optimizes capacity may be selected, at 1008. For example a rank having a highest capacity value may be deemed to optimize capacity because it will permit a highest level of transmission capacity. Once an optimal rank has been selected, CQI information for the selected rank may be generated, at 1010, by quantizing the effective SNR corresponding to the selected rank. The selected rank and associated CQI information may be transmitted to an access point, as described above with regard to preceding figures.

Figure 11:
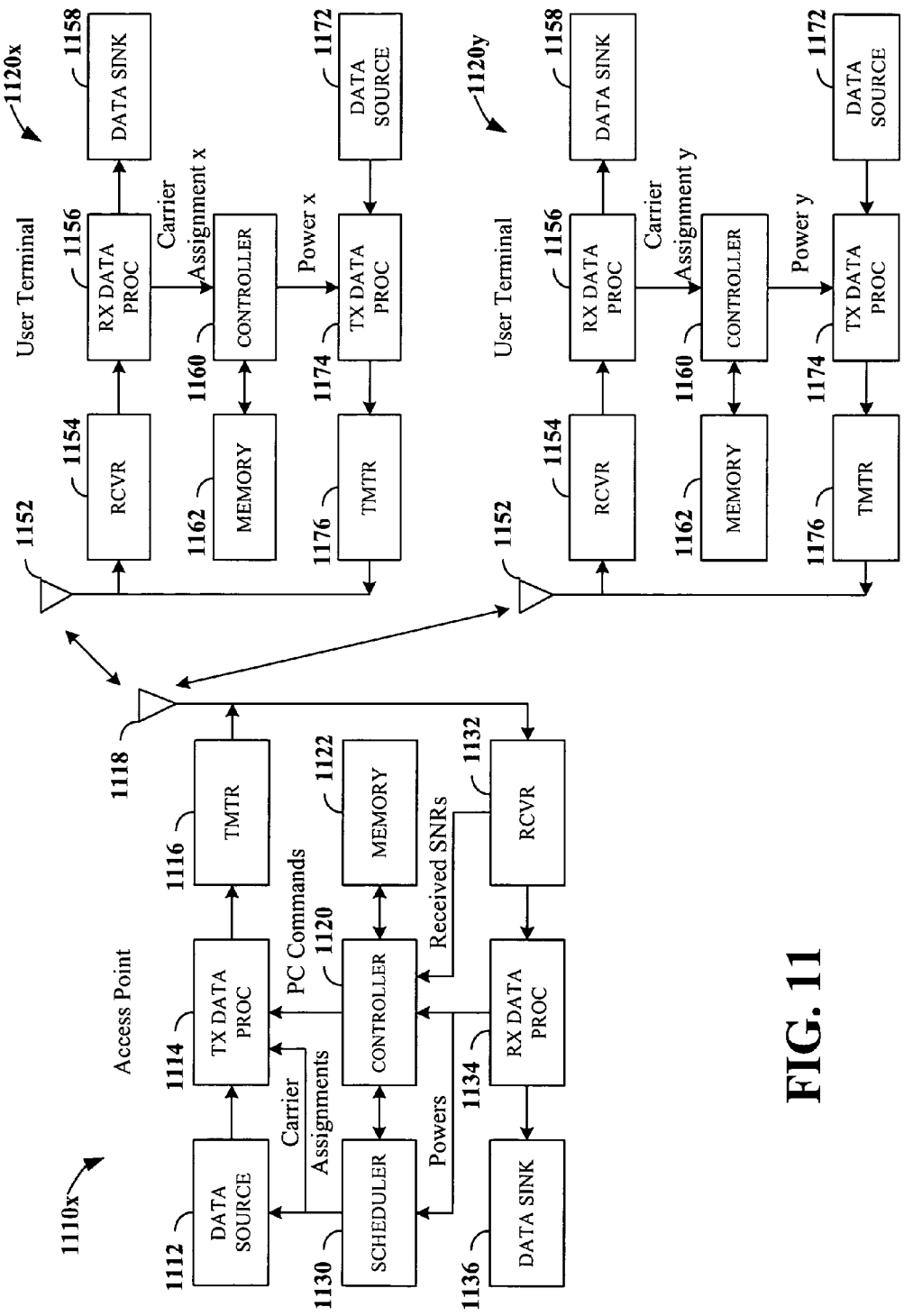
FIG. 11 is an illustration of a wireless network environment that can be employed in conjunction with the various systems and methods described herein.

FIG. 11 shows an exemplary wireless communication system 1100. The wireless communication system 1100 depicts one base station and one terminal for sake of brevity. However, it is to be appreciated that the system can include more than one base station and/or more than one terminal, wherein additional base stations and/or terminals can be substantially similar or different for the exemplary base station and terminal described below. In addition, it is to be appreciated that the base station and/or the terminal can employ the systems (FIGS. 1-3 and 12) and/or methods (FIGS. 4-10) described herein to facilitate wireless communication there between.

FIG. 11 shows a block diagram of an embodiment of an AP 1110x and two ATs 1120x and 1120y in multiple-access multi-carrier communication system. At AP 1110x, a transmit (TX) data processor 1114 receives traffic data (i.e., information bits) from a data source 1112 and signaling and other information from a controller 1120 and a scheduler 1130. For example, controller 1120 may provide power control (PC) commands that are used to adjust the transmit power of the active ATs, and scheduler 1130 may provide assignments of carriers for the ATs. These various types of data may be sent on different transport channels. TX data processor 1114 encodes and modulates the received data using multi-carrier modulation (e.g., OFDM) to provide modulated data (e.g., OFDM symbols). A transmitter unit (TMTR) 1116 then processes the modulated data to generate a downlink-modulated signal that is then transmitted from an antenna 1118.

At each of ATs 1120x and 1120y, the transmitted and modulated signal is received by an antenna 1152 and provided to a receiver unit (RCVR) 1154. Receiver unit 1154 processes and digitizes the received signal to provide samples. A received (RX) data processor 1156 then demodulates and decodes the samples to provide decoded data, which may include recovered traffic data, messages, signaling, and so on. The traffic data may be provided to a data sink 1158, and the carrier assignment and PC commands sent for the terminal are provided to a controller 1160. Controller 1160 may be configured to carry out the schemes describe above.

For each active terminal 1120, a TX data processor 1174 receives traffic data from a data source 1172 and signaling and other information from controller 1160. For example, controller 1160 may provide information indicative of the required transmit power, the maximum transmit power, or the difference between the maximum and required transmit powers for the terminal. The various types of data are coded and modulated by TX data processor 1174 using the assigned carriers and further processed by a transmitter unit 1176 to generate an uplink modulated signal that is then transmitted from antenna 1152.

At AP 1110x, the transmitted and modulated signals from the ATs are received by antenna 1118, processed by a receiver unit 1132, and demodulated and decoded by an RX data processor 1134. Receiver unit 1132 may estimate the received signal quality (e.g., the received signal-to-noise ratio (SNR)) for each terminal and provide this information to controller 1120. Controller 1120 may then derive the PC commands for each terminal such that the received signal quality for the terminal is maintained within an acceptable range. RX data processor 1134 provides the recovered feedback information (e.g., the required transmit power) for each terminal to controller 1120 and scheduler 1130.

The techniques described herein may be implemented by various means. For example, these techniques may be implemented in hardware, software, or a combination thereof. For a hardware implementation, the processing units (e.g., controllers 1120 and 1170, TX and RX processors 1114 and 1134, and so on) for these techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Figure 12:
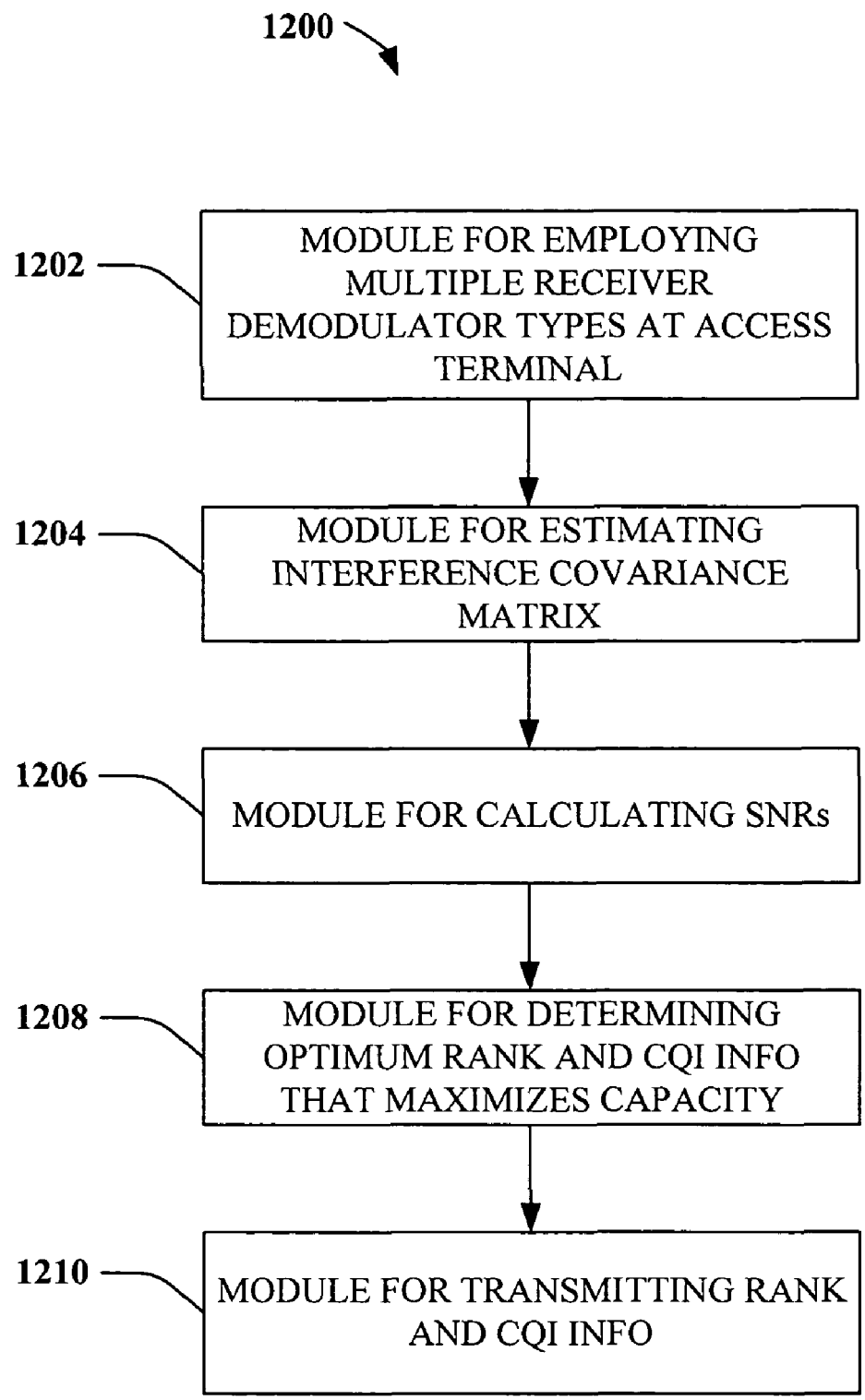
FIG. 12 illustrates an apparatus that facilitates performing rank prediction with an interference nulling technique at an access terminal, in accordance with various aspects.

FIG. 12 illustrates an apparatus 1200 that facilitates predicting rank with interference nulling in an access terminal in a wireless communication environment, in accordance with various aspects. Apparatus 1200 is represented as a series of interrelated functional blocks, or "modules," which can represent functions implemented by a processor, software, or combination thereof (e.g., firmware). For example, apparatus 1200 may provide modules for performing various acts such as are described above with regard to the preceding figures. Apparatus 1200 comprises a module for employing multiple receiver demodulator types 1202 at an access terminal, such as a wireless device, cellular phone, PDA, etc. Apparatus 1200 further comprises a module for estimating an interference covariance matrix 1204, as well as a module for calculating SNRs. Module for calculating SNRs may provide functionality for calculating any of the SNR values described above (e.g., SNRs for candidate MIMO transmissions ranks, nulling and/or non-nulling demodulator types, etc., and/or any other suitable SNR values that may facilitate performing the various actions related to the aspects described herein. Apparatus 1200 still further comprises a module for determining optimum rank 1208 (e.g., a rank that optimizes capacity) and associated CQI information, as well as a module for transmitting 1210 that transmits the selected rank and related CQI information to an access point. In this manner, apparatus 1200 and the various modules comprised thereby may carry out the methods described above and/or may impart any necessary functionality to the various systems described herein.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of performing interference nulling and rank prediction in an access terminal, comprising:
    employing multiple receiver demodulator types at the access terminal;
    estimating an interference covariance matrix;
    calculating a signal-to-noise ratio (SNR) for a plurality of the multiple receiver demodulator types;
    determining an optimum MIMO transmission rank and associated channel quality index (CQI) information across all receiver demodulator types to optimize transmission capacity; and
    transmitting the MIMO transmission rank and CQI information to an access point;
    wherein at least one of the receiver demodulator types performs an interference nulling technique.

2. The method of claim 1, wherein the receiver demodulator types comprise at least one minimum mean-squared error interference-nulling (MMSE-IN) demodulator and one or more of a maximal ratio combining (MRC) demodulator and a minimum mean-squared error (MMSE) demodulator.

3. The method of claim 1, wherein determining an optimum MIMO transmission rank and associated CQI information further comprises determining an effective SNR for one or more candidate MIMO transmission ranks, generating capacity numbers corresponding to the effective SNRs, selecting a MIMO transmission rank that optimizes capacity based on the capacity numbers, and generating CQI information by quantizing the effective SNR corresponding to the selected MIMO transmission rank.

4. The method of claim 3, further comprising estimating an average interference milling gain, employing the estimated average nulling gain to calculate an SNR for at least one MRC receiver demodulator and at least one MMSE receiver demodulator, determining an optimum MIMO transmission rank for and associated CQI information across the at least one MRC receiver demodulator and the at least one MMSE receiver demodulator, and transmitting the optimum MIMO transmission rank and CQI information to an access point.

5. The method of claim 4, wherein estimating the average interference nulling gain further comprises determining an effective SNR for the one or more candidate MIMO transmission ranks for one or more receiver demodulator types, determining a delta-effective SNR by computing a difference between effective SNRs for receiver demodulator types that employ interference nulling and receiver demodulator types that do not employ interference nulling, and determining the average interference nulling gain by averaging the delta-effective SNR over a plurality of time slots and tones.

6. The method of claim 5, wherein employing the estimated average nulling gain to calculate an SNR for at least one MRC receiver demodulator and at least one MMSE receiver demodulator further comprises determining an effective SNR for the one or more candidate MIMO transmission ranks for one or more receiver demodulator types that do not incorporate interference nulling, adding the average interference nulling gains to the effective SNR values for the one or more candidate MIMO transmission ranks, generating capacity numbers corresponding to the effective SNR values, selecting a MIMO transmission rank that optimizes capacity, and generating CQI information by quantizing the effective SNR corresponding to the selected rank.

7. An apparatus that facilitates performing interference nulling and rank prediction using hypothesis decoding in an access terminal, comprising:
    a receiver with multiple receiver demodulators at the access terminal;
    a processor that estimates an interference covariance matrix, calculates a signal-to-noise ratio (SNR) for a plurality of the multiple receiver demodulators, and determines an optimum MIMO transmission rank and associated channel quality index (CQI) information across all receiver demodulators to optimize transmission capacity; and
    a transmitter that transmits the MIMO transmission rank and CQI information to an access point;
    wherein at least one of the receiver demodulators employs an interference nulling technique.

8. The apparatus of claim 7, wherein the receiver demodulators comprise at least one minimum mean-squared error interference-nulling (MMSE-IN) demodulator and one or more of a maximal ratio combining (MRC) demodulator and a minimum mean-squared error (MMSE) demodulator.

9. The apparatus of claim 7, wherein the processor determines an optimum MIMO transmission rank and associated CQI information by determining an effective SNR for one or more candidate MIMO transmission ranks, generating capacity numbers corresponding to the effective SNRs, selecting a MIMO transmission rank that optimizes capacity based on the capacity numbers, and generating CQI information by quantizing the effective SNR corresponding to the selected MIMO transmission rank.

10. The apparatus of claim 9, wherein the processor estimates an average interference nulling gain, employs the estimated average milling gain to calculate an SNR for at least one MRC receiver demodulator and at least one MMSE receiver demodulator, and determines an optimum MIMO transmission rank for and associated CQI information across the at least one MRC receiver demodulator and the at least one MMSE receiver demodulator.

11. The apparatus of claim 10, wherein the processor estimates the average interference nulling gain by determining an effective SNR for the one or more candidate MIMO transmission ranks for one or more receiver demodulators, determining a delta-effective SNR by computing a difference between effective SNRs for receiver demodulators that employ interference nulling and receiver demodulators that do not employ interference nulling, and calculating the average interference nulling gain by averaging the delta-effective SNR over a plurality of time slots and tones.

12. The apparatus of claim 11, wherein the processor employs the estimated average nulling gain to calculate an SNR for at least one MRC receiver demodulator and at least one MMSE receiver demodulator by determining an effective SNR for the one or more candidate MIMO transmission ranks for one or more receiver demodulator types that do not incorporate interference nulling, adding the average interference nulling gains to the effective SNR values for the one or more candidate MIMO transmission ranks, generating capacity numbers corresponding to the effective SNR values, selecting a MIMO transmission rank that optimizes capacity, and generating CQI information by quantizing the effective SNR corresponding to the selected MIMO transmission rank.

13. An apparatus that facilitates performing interference nulling and rank prediction in an access terminal, comprising:
    means for employing multiple receiver demodulator types at the access terminal;
    means for estimating an interference covariance matrix;
    means for calculating a signal-to-noise ratio (SNR) for a plurality of the multiple receiver demodulator types;
    means for determining an optimum MIMO transmission rank and associated channel quality index (CQI) information across all receiver demodulator types to optimize transmission capacity; and means for transmitting the MIMO transmission rank and CQI information to an access point;

wherein at least one of the receiver demodulator types performs an interference nulling technique.

14. The apparatus of claim 13, wherein the receiver demodulator types comprise at least one minimum mean-squared error interference-nulling (MMSE-IN) demodulator and one or more of a maximal ratio combining (MRC) demodulator and a minimum mean-squared error (MMSE) demodulator.

15. The apparatus of claim 13, wherein the means for determining an optimum MIMO transmission rank and associated CQI information determines an effective SNR for one or more candidate MIMO transmission ranks, generates capacity numbers corresponding to the effective SNRs, selects a MIMO transmission rank that optimizes capacity based on the capacity numbers, and generates CQI information by quantizing the effective SNR corresponding to the selected MIMO transmission rank.

16. The apparatus of claim 15, further comprising means for estimating an average interference milling gain, means for employing the estimated average nulling gain to calculate an SNR for at least one MRC receiver demodulator and at least one MMSE receiver demodulator, and means for determining an optimum MIMO transmission rank for and associated CQI information across the at least one MRC receiver demodulator and the at least one MMSE receiver demodulator.

17. The apparatus of claim 16, wherein the means for estimating the average interference nulling gain determines an effective SNR for the one or more candidate MIMO transmission ranks for one or more receiver demodulator types, determines a delta-effective SNR by computing a difference between effective SNRs for receiver demodulator types that employ interference nulling and receiver demodulator types that do not employ interference nulling, and calculates the average interference nulling gain by averaging the delta-effective SNR over a plurality of time slots and tones.

18. The apparatus of claim 17, wherein the means for employing the estimated average nulling gain to calculate an SNR for at least one MRC receiver demodulator and at least one MMSE receiver demodulator determines an effective SNR for the one or more candidate MIMO transmission ranks for one or more receiver demodulator types that do not incorporate interference nulling, adds the average interference milling gains to the effective SNR values for the one or more candidate MIMO transmission ranks, generates capacity numbers corresponding to the effective SNR values, selects a rank that optimizes capacity, and generates CQI information by quantizing the effective SNR corresponding to the selected MIMO transmission rank.

19. A non-transitory computer-readable medium storing a computer program, wherein execution of the computer program is for:

employing multiple receiver demodulator types at an access terminal;

estimating an interference covariance matrix;

calculating a signal-to-noise ratio (SNR) for a plurality of the multiple receiver demodulator types;

determining an optimum MIMO transmission rank and associated channel quality index (CQI) information across all receiver demodulator types to optimize transmission capacity; and transmitting the MIMO transmission rank and CQI information to an access point;

wherein at least one of the receiver demodulator types performs an interference milling technique.

20. The computer-readable medium of claim 19, wherein the receiver demodulator types comprise at least one minimum mean-squared error interference-nulling (MMSE-IN) demodulator and one or more of a maximal ratio combining (MRC) demodulator and a minimum mean-squared error (MMSE) demodulator.

21. The computer-readable medium of claim 19, wherein execution of the computer program is also for determining an effective SNR for one or more candidate MIMO transmission ranks, generating capacity numbers corresponding to the effective SNRs, selecting a MIMO transmission rank that optimizes capacity based on the capacity numbers, and generating CQI information by quantizing the effective SNR corresponding to the selected MIMO transmission rank, in order to determine the optimum rank and associated CQI information.

22. The computer-readable medium of claim 21, wherein execution of the computer program is also for estimating an average interference nulling gain, employing the estimated average nulling gain to calculate an SNR for at least one MRC receiver demodulator and at least one MMSE receiver demodulator, and determining an optimum MIMO transmission rank for and associated CQI information across the at least one MRC receiver demodulator and the at least one MMSE receiver demodulator.

23. The computer-readable medium of claim 22, wherein execution of the computer program is also for determining an effective SNR for the one or more candidate MIMO transmission ranks for one or more receiver demodulator types, determining a delta-effective SNR by computing a difference between effective SNRs for receiver demodulator types that employ interference nulling and receiver demodulator types that do not employ interference nulling, and determining the average interference nulling gain by averaging the delta-effective SNR over a plurality of time slots and tones, in order to estimate the average interference nulling gain.

24. The computer-readable medium of claim 23, wherein execution of the computer program is also for determining an effective SNR for the one or more candidate MIMO transmission ranks for one or more receiver demodulator types that do not incorporate interference nulling, adding the average interference milling gains to the effective SNR values for the one or more candidate MIMO transmission ranks, generating capacity numbers corresponding to the effective SNR values, selecting a MIMO transmission rank that optimizes capacity, and generating CQI information by quantizing the effective SNR corresponding to the selected MIMO transmission rank, in order to employ the estimated average nulling gain to calculate an SNR for at least one MRC receiver demodulator and at least one MMSE receiver demodulator.

25. A processor that executes computer-executable instructions for performing rank prediction with interference nulling, the instructions comprising:

employing multiple receiver demodulator types at an access terminal;

estimating an interference covariance matrix;

calculating a signal-to-noise ratio (SNR) for a plurality of the multiple receiver demodulator types;

determining an optimum MIMO transmission rank and associated channel quality index (CQI) information across all receiver demodulator types to optimize transmission capacity; and transmitting the MIMO transmission rank and CQI information to an access point;

wherein at least one of the receiver demodulator types performs an interference nulling technique.

26. The processor of claim 25, wherein the receiver demodulator types comprise at least one minimum mean-squared error interference-milling (MMSE-IN) demodulator and one or more of a maximal ratio combining (MRC) demodulator and a minimum mean-squared error (MMS E) demodulator.

27. The processor of claim 25, the instructions further comprising determining an effective SNR for one or more candidate MIMO transmission ranks, generating capacity numbers corresponding to the effective SNRs, selecting a MIMO transmission rank that optimizes capacity based on the capacity numbers, and generating CQI information by quantizing the effective SNR corresponding to the selected MIMO transmission rank, in order to determine the optimum MIMO transmission rank and associated CQI information.

28. The processor of claim 27, the instructions further comprising estimating an average interference nulling gain, employing the estimated average nulling gain to calculate an SNR for at least one MRC receiver demodulator and at least one MMSE receiver demodulator, and determining an optimum MIMO transmission rank for and associated CQI information across the at least one MRC receiver demodulator and the at least one MMSE receiver demodulator.

29. The processor of claim 22, the instructions further comprising determining an effective SNR for the one or candidate MIMO transmission ranks for one or more receiver demodulator types, determining a delta-effective SNR by computing a difference between effective SNRs for receiver demodulator types that employ interference nulling and receiver demodulator types that do not employ interference nulling, and determining the average interference nulling gain by averaging the delta-effective SNR over a plurality of time slots and tones, in order to estimate the average interference nulling gain.

30. The processor of claim 29, the instructions further comprising determining an effective SNR for the one or more candidate MIMO transmission ranks for one or more receiver demodulator types that do not incorporate interference nulling, adding the average interference nulling gains to the effective SNR values for the one or more candidate MIMO transmission ranks, generating capacity numbers corresponding to the effective SNR values, selecting a MIMO transmission rank that optimizes capacity, and generating CQI information by quantizing the effective SNR corresponding to the selected MIMO transmission rank, in order to employ the estimated average milling gain to calculate an SNR for at least one MRC receiver demodulator and at least one MMSE receiver demodulator.

* * * * *